United States Patent Office 3,000,898
Patented Sept. 19, 1961

3,000,898
NEW BENZIMIDAZOLES
Karl Hoffmann, Binningen, and Alfred Hunger, Jindrich Kebrle, and Alberto Rossi, Basel, Switzerland, assignors to Ciba Pharmaceutical Products Inc., Summit, N.J.
No Drawing. Filed Aug. 31, 1959, Ser. No. 836,923
Claims priority, application Switzerland Sept. 19, 1958
6 Claims. (Cl. 260—309.2)

This invention provides 1-tertiary-aminoalkyl-2-phenylamino-benzimidazoles and salts thereof.

The invention provides more especially benzimidazoles of the formula

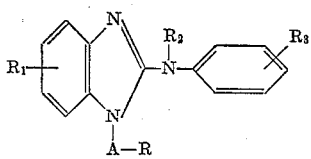

in which A represents an alkylene radical, especially a lower alkylene radical, such as the ethylene radical, and R represents a lower tertiary amino group, for example, an alkylene-imino group, which may be interrupted by a heteroatom, such as a piperidino, piperazino, pyrrolidino, morpholino or thiomorpholino group, but preferably a di-lower-alkyl-amino group the lower alkyl radicals of which contain 1 to 6 carbon atoms, and in which $R_1$ and $R_3$ each represent a hydrogen atom or an alkyl or alkoxy group, or a nitro group or halogen atom, and $R_2$ represents a hydrogen atom or an unsubstituted or substituted hydrocarbon radical, such as an alkyl or aralkyl group e.g. methyl, ethyl, propyl, benzyl carbomethoxy-carboethoxy-or carbopropoxy-methyl-ethyl or propyl, or an acyl group, more especially a lower alkanoyl group such as formyl, acetyl, propionyl or a carbalkoxy, especially a carbo lower alkoxy group, and salts of these compounds.

The new compounds possess a very good analgesic action and inhibit polysynaptic reflexes; they are therefore useful as analgesics and muscle relaxants. Of special interest owing to their therapeutic properties are compounds of the formula

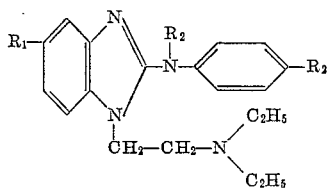

in which $R_1$ has the meanings given above, $R_2$ represents an acyl group, especially a lower alkanoyl group or a benzyl radical, and $R_3$ represents a p-lower alkoxy group, and above all 1-($\beta$-diethylaminoethyl)-2-[N-(para-ethoxyphenyl)-N-acetyl-amino] - 5 - nitro-benzimidazole, 1-($\beta$-diethylamino-ethyl)-2-[N - (p - ethoxyphenyl)-N-formyl-amino]-5-nitro-benzimidazole, 1-($\beta$-diethylamino-ethyl)-2-[N-(p-ethoxyphenyl) - N - benzyl-amino]-5-nitro-benzimidazole and 1-($\beta$-diethylaminoethyl)-2-[N-(p-ethoxyphenyl)-N-acetyl-amino]-benzimidazole and salts of these compounds.

The new benzimidazoles are obtained by methods in themselves known. In one process, for example, an amino alkyl group is introduced directly or in stages into the 1-position of a 2-phenylamino-benzimidazole especially of a 2-N-acyl or 2-N-benzyl-phenylamino-benzimidazole. Thus, a 2-phenylamino-benzimidazole advantageously on in which the amino group is substituted in the manner indicated, may be reacted with a reactive ester of an alcohol of the formula

HO—A—R' in which A has the meaning given above, and R' represents a tertiary amino group, or a substituent convertible into such an amino group, for example, a hydroxyl group, and, when the resulting compound contains a substituent convertible into an amino group, the said substituent is so converted, a hydroxyl group, for example, by chlorination followed by reaction with a secondary amine. Reactive esters are more especially those of strong inorganic or organic acids, such as hydrohalic acids or organic sulfonic acids such as para-toluene sulfonic acid. The reaction is advantageously carried out in the presence of a condensing agent, especially one which is capable of forming a metal salt with the benzimidazole, such as an alkali metal or alkaline earth metal, for example, sodium, lithium, calcium, or an amide, hydride, hydrocarbon compound, alcoholate, oxide or hydroxide of such metal, for example, sodamide, sodium hydride, lithium butyl, potassium phenyl, lithium phenyl, potassium tertiary butylate, potassium tertiary amylate, sodium ethylate, sodium oxide or sodium hydroxide, or there may be used a preformed metal salt of the benzimidazole.

In another process for making the new compounds the benzimidazole ring is formed by subjecting to ring closure a 2-(R''—NH) aniline or an N-substitution product thereof, in which R'' represents the aforesaid group R—A— or a radical convertible into such group, for example, a hydroxy alkyl group. The substituent convertible into the group R—A— is subsequently converted into such group, in the case of a hydroxy-alkyl group, for example, by chlorination and reaction with a secondary amine. Thus, for example, a 2-tertiary aminoalkyl-amino-aniline may be subjected to ring closure directly or in stages with a phenyl carbamic acid derivative, such as a diphenylurea or diphenyl-thiourea or a derivative thereof, such as an S-substituted isothiourea, or with a diphenyl carbodiimide.

The reactions may be carried out in the presence or absence of a diluent and/or a condensing agent, and when necessary at a raised temperature under atmospheric or superatmospheric pressure.

In the product so obtained a secondary amino group in the 2-position may be alkylated, aralkylated acylated or carbalkoxylated. A substituent in the aryl radical may be exchanged for another group, for example, a hydroxyl group for an etherified or esterified hydroxyl group such as a lower alkoxy group, or a nitro group for an amino group and the latter group exchanged for a halogen atom.

Depending on the procedure used the new compounds are obtained in the form of the free bases or salts thereof. From the salts the free bases can be obtained by reaction with an inorganic base. From the free bases salts can be obtained by reaction with acids suitable for the formation of therapeutically useful salts, for example, hydrohalic acids, sulfuric acid, nitric acid, phosphoric acid, thiocyanic acid, acetic acid, propionic acid, oxalic acid, malonic acid, succinic acid, malic acid, tataric acid, maleic acid, lactic acid, lysine, leucine, methane sulfonic acid, ethane sulfonic acid, oxyethane sulfonic acid, benzene or toluene sulfonic acid or a therapeutically active acid. The starting materials are known or can be made by methods in themselves known.

The invention also includes any modification of the process in which there is used as starting material a compound obtainable as an intermediate product at any stage of the process and the remaining steps of the process are carried out.

The new compounds can be used as medicaments, for example, in the form of pharmaceutical preparations which contain the compound or a salt thereof in admixture with a pharmaceutical organic or inorganic, solid or liquid carrier suitable for enteral, parenteral or topical administration. For making the carriers there are used substances which do not react with the new compounds or salts thereof, for example, water gelatine, lactose, starches, magnesium stearate, talc, vegetable oils, benzyl alcohols, gums, polyalkylene glycols, white petroleum jelly, cholesterol or other carrier known for medicaments. The pharmaceutical preparations may be, for example, in the form of tablets, dragees, salves or creams, or in liquid form as solutions, suspensions or emulsions. If desired, they may be sterilized and/or may contain auxiliary substances such as preserving, stabilizing, wetting or emulsifying agents, salts for controlling the osmotic pressure or buffers. They may also contain other therapeutically useful substances.

The following examples illustrate the invention:

Example 1

10.3 grams of 2-(β-diethylamino-ethylamino)-aniline are mixed with 8.5 grams of diphenyl-carbodiimide, whereupon an exothermic reaction occurs. When the reaction has subsided, the mixture is heated for 20 minutes at 200° C., then cooled and dissolved in 2N-hydrochloric acid, and the solution is washed with ether and rendered alkaline with ammonia. The liberated base is taken up in chloroform, the chloroform solution is washed with sodium carbonate, dried with magnesium sulfate and evaporated. The residue is distilled in a high vacuum, whereby 1 - (β - diethylaminoethyl)-2-phenylamino-benzimidazole of the formula

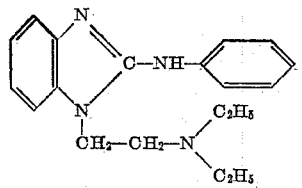

is obtained as a thick oil boiling at 180-190° C. under 0.06 Tor.

By dissolving the base in ethanol and mixing the solution with the calculated quantity of hydrochoric acid in ethanol the hydrochloride melting at 235-237° C. is obtained.

By the same process there can be obtained from 2-(β-diethylamino-ethylamino)-5-nitro-aniline and diphenyl-carbodiimide, 1-(β-diethylamino-ethyl)-2-phenylamino-5-nitrobenzimidazole of the formula

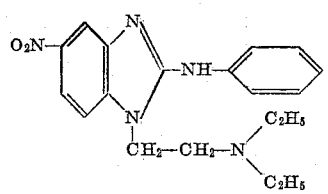

in the form of a crystalline compound melting at 146-147° C., and its hydrochloride melting at 226-227° C.

Example 2

8.5 grams of 2-(β-diethylamino-ethylamino)-aniline are mixed with 12.1 grams of S-methyl-sym-diphenyl-isothiourea and the mixture is heated for 2 hours at 150° C., during which a part of the aniline split off distils. The reaction product is dissolved in 2N-hydrochloric acid, and the solution is filtered, washed with ether and rendered alkaline with ammonia, and the liberated base is taken up in chloroform. The chloroform solution is washed with sodium carbonate, dried with magnesium sulfate, evaporated and distilled in a bulb tube under a high vacuum, whereby 1 - (β - diethylaminoethyl) - 2-phenylamino-benzimidazole is obtained as a viscous oil boiling at 190-200° C. under 0.08 Tor. Its hydrochloride melts at 235-237° C.

By the same process there can be obtained from 2-(β-diethylamino-ethylamino)-5-nitroaniline and S-methyl-symdiphenyl-isothiourea, 1-(β-diethylaminoethyl)-2-phenylamino-5-nitro-benzimidazole in the form of a crystalline compound melting at 146-147° C., and its hydrochloride melting at 226-227° C.

By the same process there can also be obtained from 2-(β-diethylamino-ethylamino)-aniline and S-methyl-sym-di-(para-methoxyphenyl)-isothiourea, 1-(β-diethylaminoethyl)-2-(para-methoxyphenylamino) - benzimidazole of the formula

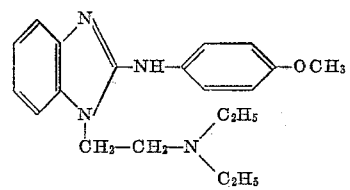

as a crystalline compound melting at 116-117° C., and its hydrochloride melting at 223-224° C.

By using as starting materials 2-(β-diethylaminoethylamino) - aniline and S - methyl-sym-di-(para-ethoxyphenyl)-isothiourea, there is obtained by the same process 1-(β-diethylamino-ethyl)-2-(para-ethoxyphenylamino)-benzimidazole of the formula

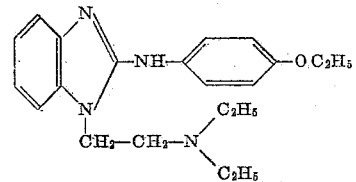

and its hydrochloride melting at 197-198° C.

In an analogous manner there can be obtained by reacting 2-(β-diethylamino-ethylamino) -5- nitro - aniline with 5-methyl-sym-di-(para-methoxyphenyl)-isothiourea 1-(β-diethylaminoethyl)-2-(para - methoxyphenylamino)-5-nitro-benzimidazole of the formula

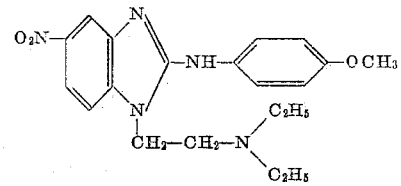

as a crystalline powder melting at 115-116° C., and its hydrochloride melting at 240-241° C.

By using as starting materials 2-(β-diethylamino-ethylamino)-5-nitro-aniline and S-methyl-sym-di-(para-ethoxyphenyl)-isothiourea the same process leads to 1-(β-diethylaminoethyl)-2-(para-ethoxyphenyl-amino)-5-nitro- benzimidazole of the formula

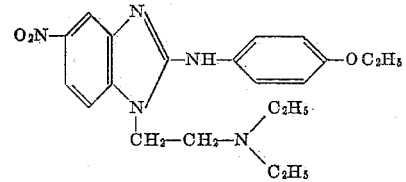

in the form of a crystalline compound melting at 124-125° C. of which the hydrochloride melts at 195-196° C.

By reacting 2-(β-diethylamino-ethylamino)-5-chloraniline by the same process with S-methyl-sym-di-(para-ethoxyphenyl)-isothiourea there is obtained 1-(β-diethylaminoethyl)-2-(para-ethoxyphenylamino) - 5 - chlorobenzimidazole of the formula

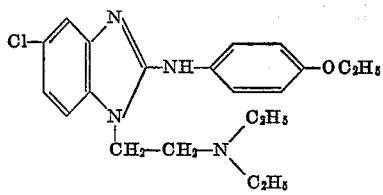

of which the hydrochloride melts at 166–170° C.

The S-methyl-sym-di-(para-methoxyphenyl)-isothiourea can be prepared in the following manner:

98.4 grams of para-ansidine, 60 grams of carbon disulfide and 4 grams of sulfur are boiled under reflux in 400 ml. of alcohol for 2 hours. The alcoholic solution is concentrated to crystallize sym-di-(para-methoxyphenyl)-thiourea melting at 183–184° C.

10.2 grams of the latter compound are dissolved in 100 ml. of acetone, 5.7 grams of dimethylsulfate are added dropwise at room temperature, while stirring, and the mixture is boiled for 4 hours under reflux. The reaction mixture is evaporated, and mixed with ice water, rendered alkaline with sodium carbonate and extracted with chloroform. After being dried with magnesium sulfate, the chloroform solution is concentrated, whereby S-methyl-sym-di-(para-methoxyphenyl)-isothiourea melting at 74–76° C. crystallizes out.

By using phenetidine and carbon disulfide as starting materials there is obtained by the same process sym-di-(para-ethoxyphenyl)-thiourea melting at 170° C. Its S-methyl-derivative melts at 93–95° C.

Example 3

9 grams of 1-(β-diethylaminoethyl)-2-(para-ethoxyphenylamino)-5-nitrobenzimidazole are dissolved in 50 ml. of glacial acetic acid and treated with 3.23 ml. of acetic anhydride. The mixture is boiled under reflux for 3 hours, evaporated, the residue is taken up in water, the solution is rendered alkaline with ammonia, and the liberated base is taken up in chloroform. The chloroform solution is washed with sodium carbonate, dried with magnesium sulfate and evaporated. After recrystallizing the residue from acetone it melts at 127–129° C. and is 1-(β-diethylaminoethyl)-2-[N-(para-ethoxyphenyl)-N-acetyl-amino]-5-nitro-benzimidazole of the formula

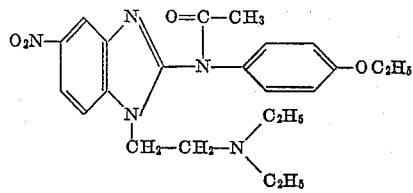

By treating a methanolic solution of the base with the calculated quantity of alcoholic hydrochloric acid there is obtained the crystalline hydrochloride melting at 220–222° C.

By using 1-(β-diethylaminoethyl)-2-(para-ethoxy-phenylamino)-benzimidazole as starting material in the same process there is obtained 1-(β-diethylaminoethyl)-2-[N-(para-ethoxyphenyl)-N-acetyl - amino] - benzimidazole of the formula

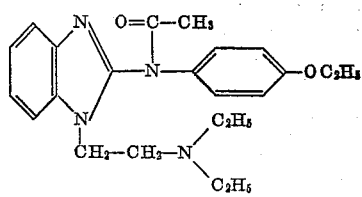

Its hydrochloride melts at 198–199° C.

Example 4

A mixture of 22.1 grams of 2-(β-diethylamino-ethylamino)-5-methyl-aniline and 33.5 grams of S-methyl-sym-di-(p-ethoxyphenyl)-iso-thiourea is heated for 10 hours at 150–160° C. The reaction product is dissolved in 2N-hydrochloric acid, the solution filtered, washed with ethyl acetate, rendered alkaline with ammonia and the liberated base taken up in ether. The ethereal solution is washed with water, dried with magnesium sulfate, evaporated and distilled in a bulb tube, 1-(β-diethylaminoethyl)-2-(p-ethoxy-phenylamino) - 5 - methyl-benzimidazole of the formula

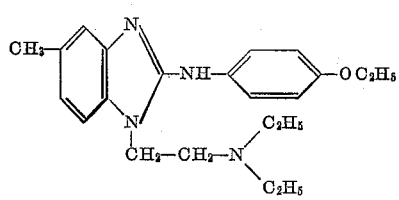

being obtained as a viscous oil boiling at 220–230° C. under 0.01 mm. of pressure. Its dihydrochloride-monohydrate melts at 116–117° C.

Example 5

10.6 grams of 1-(β-diethylaminoethyl)-2-(p-ethoxyphenylamino)-5-methyl-benzimidazole are dissolved in 65 ml. of glacial acetic acid and treated with 4.2 ml. of acetic anhydride. The mixture is boiled under reflux for 4 hours, evaporated and the residue taken up in water, rendered alkaline with ammonia and the liberated base taken up in chloroform. The chloroform solution is washed with sodium carbonate, dried with magnesium sulfate and evaporated. The faintly brown, oily residue is 1-(β-diethylamino-ethyl)-2-[N-(p-ethoxy - phenyl) - N-acetylamino]-5-methyl-benzimidazole of the formula

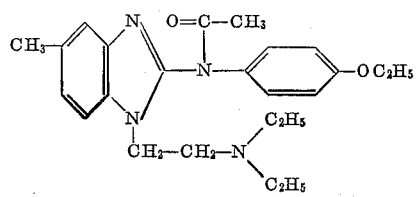

On treating the alcoholic solution of the base with the calculated quantity of alcoholic hydrochloric acid there is obtained the crystallized hydrochloride which after being recrystallized from a mixture of methanol and ether melts at 209–210° C.

Example 6

13.8 grams of 2-(β-piperidino-ethylamino)-5-nitro-aniline are mixed with 18 grams of S-methyl-sym-di-(p-ethoxy-phenyl)-iso-thiourea and heated for 10 hours at 150° C. The reaction mixture is dissolved in 2N-hydrochloric acid, the solution filtered, washed with ethyl acetate, rendered alkaline with ammonia, and the liberated base taken up in chloroform. The chloroform solution is washed with sodium carbonate and water, dried with magnesium sulfate and evaporated. The solid residue is recrystallized from a mixture of ethanol and chloroform, and 1-(β-piperidino-ethyl)-2-(p-ethoxy-phenylamino)-5-nitro-benzimidazole of the formula

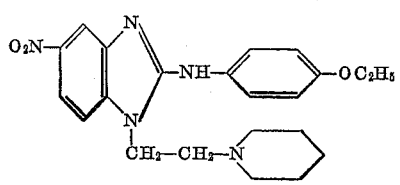

melting at 163–166° C. is obtained.

By reacting the alcoholic solution of the base with the calculated quantity of alcoholic hydrochloric acid there is obtained the hydrochloride melting at 165–169° C.

Example 7

3 grams of 1-(β-piperidino-ethyl)-2-(p-ethoxy-phenylamino)-5-nitro-benzimidazole are dissolved in 20 ml. of glacial acetic acid and treated with 1.3 ml. of acetic anhydride. The mixture is boiled under reflux for 4 hours, evaporated, the residue poured into ice water, rendered alkaline with ammonia, and the liberated base taken up in chloroform. The chloroform solution is washed with sodium carbonate and water, dried with magnesium sulfate and evaporated. The solid residue is recrystallized from a mixture of ethyl acetate and petroleum ether, 1-(β-piperidino-ethyl)-2-[N-(p-ethoxyphenyl)-N-acetylamino]-5-nitro-benzimidazole of the formula

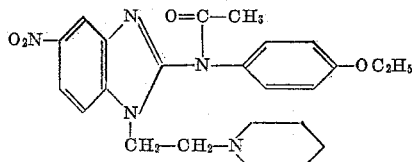

being obtained as faintly yellow crystals melting at 132–134° C.

Example 8

14.5 grams of 1-(β-diethylamino-ethyl)-2-phenylamino-benzimidazole are boiled in 40 ml. of glacial acetic acid with 7.05 ml. of acetic anhydride for 6 hours under reflux. The reaction mixture is then evaporated in vacuo, the residue taken up in water, rendered alkaline with ammonia and the liberated base extracted with chloroform. The chloroform solution is washed with sodium carbonate solution, dried over magnesium sulfate and evaporated. The resulting 1-(β-diethylamino-ethyl)-2-(phenyl-N-acetyl-amino)-benzimidazole of the formula

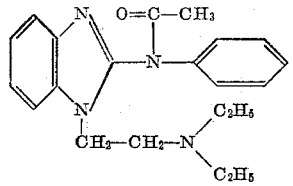

distills in a bulb tube at 170–180° C. under 0.2 mm. of pressure. Its hydrochloride melts at 118–119° C.

By the same process there is obtained from 1-(β-diethylamino-ethyl) - 2 - (p - methoxy - phenylamino) - benzimidazole 1 - (β - diethylamino - ethyl)-2-[N-(p-methoxyphenyl)-N-acetyl-amino]-benzimidazole of the formula

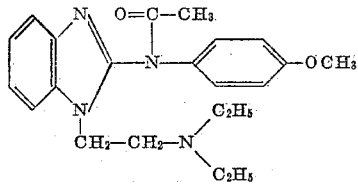

melting at 95–96° C. Its hydrochloride melts at 180–182° C.

Starting from 1-(β-diethylamino-ethyl)-2-(p-methoxyphenylamino)-5-nitro-benzimidazole there is obtained by the same process 1-(β-diethylamino-ethyl)-2-[N-(p-methoxy-phenyl)-N-acetyl-amino]-5-nitro-benzimidazole of the formula

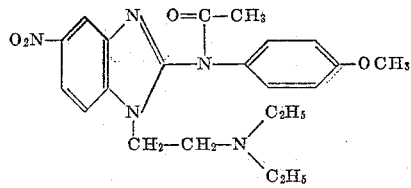

melting at 90–91° C. Its hydrochloride melts at 219–220° C.

Starting from 1-(β-diethylamino-ethyl)-2-phenylamino-5-nitro-benzimidazole there is obtained by the same process 1 - (β - diethylamino - ethyl) - 2 - (N-phenyl-N-acetylamino)-5-nitro-benzimidazole of the formula

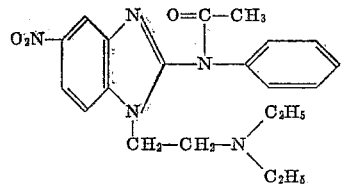

as a viscous oil, the hydrochloride of which melts at 219–220° C.

Example 9

10.7 grams of 1-(β-diethylamino-ethyl)-2-phenylamino-benzimidazole are heated in 50 ml. of propionic acid with 6.75 grams of propionic acid anhydride for 6 hours at 120° C. The reaction mixture is then evaporated in vacuo, the residue taken up in water, rendered alkaline with ammonia and extracted with chloroform. The chloroform solution is washed with sodium carbonate solution, dried over magnesium sulfate and evaporated. The resulting 1 - (β - diethylamino - ethyl)-2-(N-phenyl-N-propionyl-amino)-benzimidazole of the formula

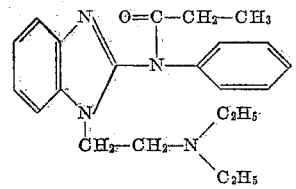

is converted into its hydrochloride melting at 192–193° C.

1 - (β - diethylamino - ethyl) - 2 - (p - methoxy -phenylamino)-benzimidazole can be converted by the same process into 1 - (β - diethylamino - ethyl)-2-[N-(p-methoxyphenyl)-N-propionylamino]-benzimidazole of the formula

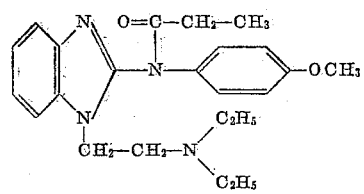

melting at 105–106° C., the hydrochloride of which melts at 224–225° C.

1 - (β - diethylamino - ethyl) - 2 - phenylamino - 5-nitro-benzimidazole can be converted by the same process into 1-(β-diethylamino-ethyl)-2-(N-phenyl-N-propionyl-amino)-5-nitro-benzimidazole of the formula

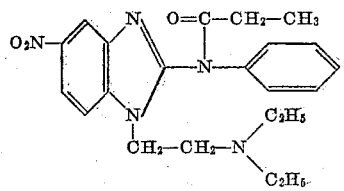

melting at 102–103° C. Its hydrochloride melts at 200–202° C.

Example 10

15 grams of 1-(β-diethylamino-ethyl)-2-(paraethoxyphenyl)-5-nitro-benzimidazole are dissolved in a mixture consisting of 10.2 grams of formic acid and 24.6 grams of acetic anhydride which mixture has previously been heated to 60° C., and the reaction mixture maintained at 60° C. for 6 hours. After evaporating in vacuo, the residue is agitated with a mixture of 100 ml. of ether and 25 ml. of aqueous sodium carbonate until the whole dissolves. The ethereal extract is dried and evaporated to a volume of 15 ml. On cooling, 1-(β-diethylaminoethyl) - 2 - [N - (p - ethoxy - phenyl) - N - formyl-amino]-5-nitro-benzimidazole of the formula

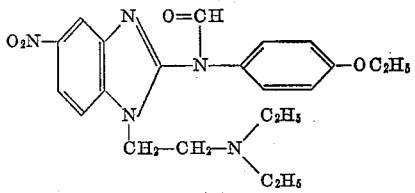

which melts at 102° C., crystallizes out. The hydrochloride of this base melts at 225–228° C.

*Example 11*

By an analogous process to that described in Example 16, from 8 grams of 1-(β-diethylamino-ethyl)-2-(p-ethoxy-phenylamino)-5-nitro-benzimidazole, 0.53 grams of sodium hydride and 2.03 grams of propionylchloride in dioxane solution there is obtained 1-(β-diethylamino-ethyl)-2 - [N - (p - ethoxyphenyl) - N - propionyl - amino] - 5-nitro-benzimidazole of the formula

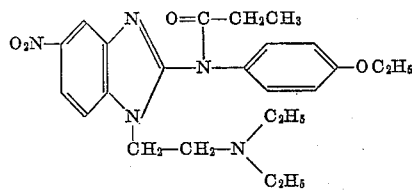

which as free base melts at 113–115° C. and in the form of its hydrochloride at 230–235° C.

*Example 12*

By an analogous process to that described in Example 16, from 12 grams of 1-(β-diethylamino-ethyl)-2-(p-ethoxy-phenylamino)-5-nitro-benzimidazole, 0.8 gram of sodium hydride and 4.7 grams of benzoyl chloride in dioxane solution there is obtained 1-(β-diethylamino-ethyl) - 2 - [N-(p-ethoxyphenyl) - N - benzoylamino]-5-nitro-benzimidazole of the formula

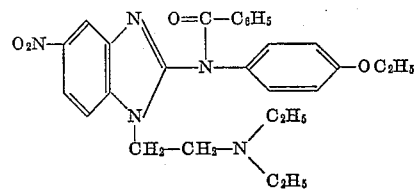

which in the form of its hydrochloride melts at 249–250° C.

*Example 13*

By an analogous process to that described in Example 16, from 12 grams of 1-(β-diethylamino-ethyl)-2-(p-ethoxy-phenylamino)-5-nitro-benzimidazole, 1.2 grams of sodium hydride and 3.3 grams of chloroformic acid ethyl ester in dioxane solution there is obtained 1-(β-diethylamino-ethyl)-2-[N-(p-ethoxy-phenyl) - N - carbethoxy · amino]-5-nitro-benzimidazole of the formula

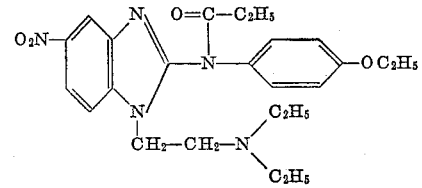

which in the form of its hydrochloride melts at 196–197° C.

*Example 14*

By an analogous process to that described in Example 16, from 12 grams of 1-(β-diethylamino-ethyl)-2-(p-ethoxy-phenylamino)-5-nitro-benzimidazole, 0.8 gram of sodium hydride and 6 grams of bromacetic acid ester in dioxane solution there is obtained 1-(β-diethylamino-ethyl)-2-[N-(p-ethoxy-phenyl)-N-(carbethoxy - methyl)-amino]-5-nitro-benzimidazole of the formula

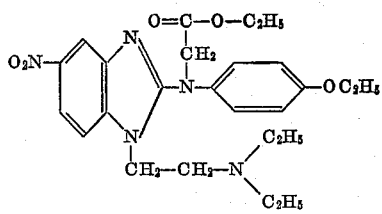

which as base melts at 96–98° C. and in the form of its hydrochloride at 169–171° C.

*Example 15*

By an analogous process to that described in Example 16, from 12 grams of 1-(β-diethylamino-ethyl)-2-(p-ethoxy-phenylamino)-5-nitro-benzimidazole, 0.8 gram of sodium hydride and 3.8 grams of benzyl chloride in dioxane solution there is obtained 1-(β-diethylamino-ethyl)-2-[N-(p - ethoxy-phenyl)-benzylamino]-5-nitro-benzimidazole of the formula

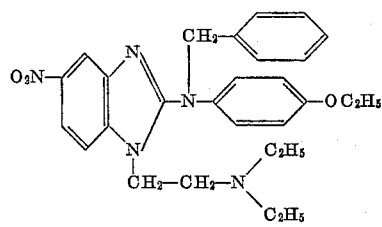

which in the form of its dihydrochloride melts at 196–198° C.

*Example 16*

12 grams of 1-(β-diethylamino-ethyl)-2-(p-ethoxy-phenylamino)-5-nitro-benzimidazole are dissolved in 75 ml. of dioxane, 0.8 gram of sodium hydride is added to the solution and the deep blue solution heated at 60° C. with stirring until the evolution of hydrogen practically ceases. 5.3 grams of ethyl iodide dissolved in 5 ml. of dioxane are added dropwise at the above temperature, and the reaction mixture stirred for half an hour at 100° C.; the solvent is then evaporated in vacuo. The residue is taken up in 30–40 ml. of ether, the ethereal solution allowed to stand in a refrigerator, filtered off from the starting material which crystallizes out; 9.5 ml. of 3.12N-alcoholic hydrochloric acid are added and the reaction mass then evaporated to dryness. The so-obtained hydrochloride of 1-(β - diethylamino-ethyl)-2-[N-(p-ethoxy-phenyl)-ethylamino]-5-nitro-benzimidazole of the formula

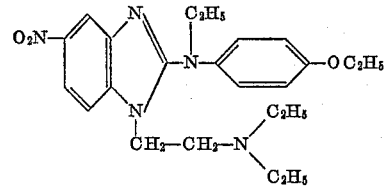

is recrystallized from isopropanol for the purpose of purification and melts at 178–179° C.

*Example 17*

9.55 grams of 2-(p-methoxy-phenylamino)-benzimidazole are stirred in 100 ml. of absolute dioxane with 1.15 grams of sodium hydride at 90° C. until no further evolution of gas can be detected. 6.5 grams of β-chlorethyl-diethylamine are then added dropwise at 60° C., and the whole is stirred for 14 hours at 60° C. The reaction mixture is then suction-filtered, the filtrate evaporated under reduced pressure, the residue taken up in dilute hydrochloric acid, the solution extracted with ether and rendered alkaline again with ammonia solution. The liberated base is taken up in chloroform, washed with sodium carbonate solution, dried over magnesium sulfate and evaporated. The residue recrystallized from ether yields pure 1-(β-diethylamino-ethyl)-2-(p-methoxy-phenylamino)-benzimidazole melting at 116–117° C.

The 2-(p-methoxy-phenylamino)-benzimidazole used as starting material can be prepared as follows:

32.4 grams of o-phenylene-diamine and 81.6 grams of S-methyl-sym-di-(p - methoxy-phenyl) - isothiourea are heated for 15 hours at 160° C., methyl-mercaptan being liberated. By crystallizing the reaction mixture 2-(p-methoxy-phenyl-amino)-benzimidazole melting at 177–178° C. is obtained.

Example 18

5.62 grams of 2 - [N - (p-methoxy-phenyl)-N-acetyl-amino]-benzimidazole are stirred under reflux in 50 ml. of absolute dioxane with 0.8 grams of sodium hydride until no further evolution of gas is detectable. 4.1 grams of β-chlorethyl-diethylamine are then added dropwise and the whole is stirred for 14 hours at 60° C. The mixture is then suction-filtered, the filtrate evaporated under reduced pressure, the residue taken up in dilute hydrochloric acid, extracted with ether and rendered alkaline again with dilute ammonia. The liberated base is taken up in chloroform, washed with sodium carbonate solution, dried over magnesium sulfate and evaporated. The residue recrystallized from ether yields pure 1-(β-diethylamino-ethyl)-2-[N-(p-methoxy-phenyl)-N-acetyl-amino] - benzimidazole melting at 95–96° C.

The 2-[N-(p-methoxy-phenyl)-N-acetyl-amino]-benzimidazole used as starting material can be prepared as follows:

9.55 grams of 2-(p-methoxy-phenylamino)-benzimidazole are boiled with 5.7 ml. of acetic anhydride and 30 ml. of glacial acetic acid for 14 hours, concentrated under reduced pressure, diluted with ether and suction-filtered. The resulting acetyl derivative melts at 173–175° C.

Example 19

9 grams of 2-(β-dimethylamino-ethylamino)-aniline and 12.1 grams of S-methyl-di-(p-ethoxy-phenyl)-isothiourea are heated together for 3 hours at 160° C., any methyl-mercaptan formed being removed. The reaction product is dissolved in 2N-hydrochloric acid, the solution washed with ether, rendered alkaline with ammonia and the liberated base taken up in chloroform. The chloroform solution is washed with sodium carbonate solution and dried over magnesium sulfate and, after being evaporated and recrystallized from a mixture of acetone, ether and pentane, yields 1-(β-dimethyl - aminoethyl)-2-(p-ethoxy-phenylamino)-benzimidazole of the formula

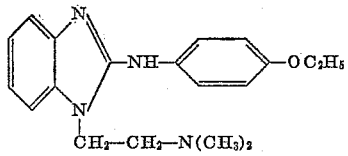

melting at 95–96° C. The hydrochloride melts unsharply between 90 and 155° C.

Example 20

11.2 grams of 2-(β-dimethylamino-ethylamino)-5-nitro-aniline are heated with 12.1 grams of S-methyl-di-(p-ethoxy-phenyl)-isothiourea for 3 hours at 150–160° C., any methyl-mercaptan formed being removed. The reaction product is dissolved in 2N-hydrochloric acid, the solution washed with ether, rendered alkaline with ammonia and the liberated base taken up in chloroform. The chloroform solution is washed with sodium carbonate solution and dried over magnesium sulfate, evaporated and recrystallized from a mixture of acetone and ether to yield 1-(β-dimethylamino-ethyl)-2-(p-ethoxy-phenylamino)-5-nitro-benzimidazole of the formula

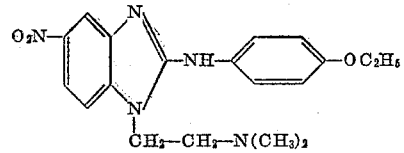

melting at 153–154° C. The hydrochloride melts at 240–241° C.

Example 21

1.8 grams of 1-(β-dimethylamino-ethyl)-2-(p-ethoxy-phenylamino)-5-nitro-benzimidazole are boiled under reflux in 20 ml. of glacial acetic acid with 0.7 ml. of acetic anhydride for 12 hours, evaporated, the residue taken up in water, rendered alkaline with ammonia solution and the liberated base taken up in chloroform. The chloroform solution is washed with sodium carbonate solution and dried over magnesium sulfate, evaporated and recrystallized from ether to yield 1-(β-dimethylamino-ethyl)-2 - [N-(p-ethoxy-phenyl)-N-acetyl-amino]-5-nitro-benzimidazole of the formula

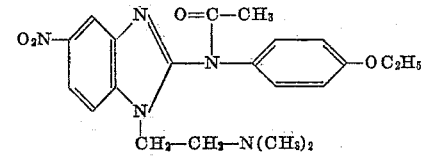

melting at 137–138° C. The hydrochloride melts at 199–200° C.

Example 22

5 grams of 1-(β-dimethylamino-ethyl)-2-(p-ethoxy-phenylamino)-benzimidazole are boiled in 50 ml. of glacial acetic acid with 2.15 ml. of acetic anhydride for 12 hours, evaporated, the residue taken up in water, rendered alkaline with ammonia solution and the liberated base taken up in chloroform. The chloroform solution is washed with sodium carbonate solution, dried over magnesium sulfate, evaporated and recrystallized from ether to yield 1 - (β-dimethylamino-ethyl) - 2 - [N-(p-ethoxy-phenyl)-N-acetylamino]-benzimidazole of the formula

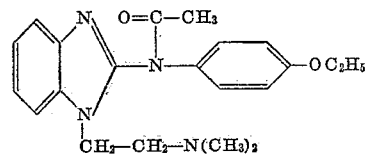

melting at 89–90° C. The hydrochloride melts at 224–225° C.

What is claimed is:

1. A member selected from the group consisting of benzimidazoles of the formula

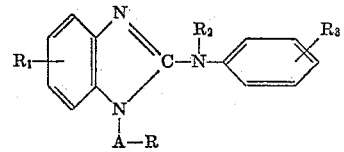

in which A stands for a lower alkylene radical and R for a member selected from the group consisting of piperidino, pyrrolidino, morpholino, piperazino, thiomorpholino, and di-lower alkylamino, and in which $R_1$ and $R_3$ stand for a member selected from the group consisting of hydrogen, lower alkyl, lower alkoxy, the nitro group and halogen and $R_2$ for a member selected from the group consisting of hydrogen, a lower alkyl, benzyl, carbo-lower alkoxy-lower alkyl, lower alkanoyl, and lower carbalkoxy, and the therapeutically useful acid addition salts thereof.

2. Benzimidazoles of the formula

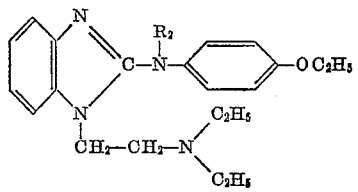

in which $R_2$ stands for lower alkanoyl.

3. 1 - ($\beta$-diethylamino-ethyl)-2-[N-(p-ethoxy-phenyl)-N-acetylamino]-5-nitro-benzimidazole.

4. 1 - ($\beta$-diethylamino-ethyl)-2-[N-(p-ethoxy-phenyl)-N-formyl-amino]-5-nitro-benzimidazole.

5. 1 - ($\beta$-diethylamino-ethyl) - 2 - (p-ethoxy-phenyl-amino)-5-chloro-benzimidazole.

6. Benzimidazoles of the formula

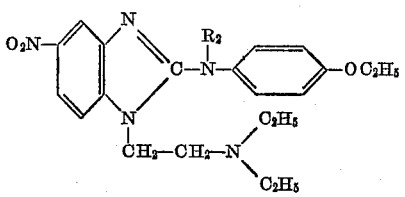

in which $R_2$ represents lower alkanoyl.

No references cited.

UNITED STATES PATENT OFFICE
CERTIFICATE OF CORRECTION

Patent No. 3,000,898                 September 19, 1961

Karl Hoffmann et al.

It is hereby certified that error appears in the above numbered patent requiring correction and that the said Letters Patent should read as corrected below.

Column 1, lines 45 to 54, upper right-hand portion of the formula, for

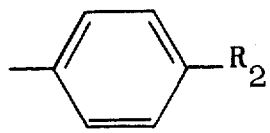      read     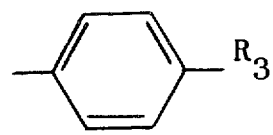

column 4, line 7, for "symdiphenyl" read -- sym-diphenyl --;
column 6, line 6, for "ethyl acteate" read -- ethyl acetate --;
column 9, lines 60 to 66, for that portion of the formula reading

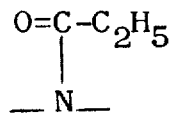     read     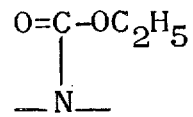

Signed and sealed this 10th day of July 1962.

(SEAL)
Attest:
ERNEST W. SWIDER
Attesting Officer

DAVID L. LADD
Commissioner of Patents